April 1, 1969  J. G. HARDWICK  3,436,289
METHOD OF MAKING A CORRUGATED TUBE OF
FIBER-REINFORCED PLASTIC MATERIAL
Filed Jan. 28, 1965  Sheet 1 of 2

INVENTOR
JOHN GORDON HARDWICK
BY Cushman, Darby & Cushman
ATTORNEYS

United States Patent Office 3,436,289
Patented Apr. 1, 1969

3,436,289
METHOD OF MAKING A CORRUGATED TUBE OF FIBER-REINFORCED PLASTIC MATERIAL
John Gordon Hardwick, Kidderminster, England, assignor to Imperial Metal Industries (Kynoch) Limited, London, England, a corporation of Great Britain
Filed Jan. 28, 1965, Ser. No. 428,712
Claims priority, application Great Britain, Feb. 4, 1964, 4,665/64
Int. Cl. B65h 81/00; B31c 13/00
U.S. Cl. 156—175               4 Claims

ABSTRACT OF THE DISCLOSURE

A corrugated tube made of reinforced plastic is made by: providing a mandrel having a series of axially-spaced, radially-projecting ridges; helically winding at least one layer of filament around the mandrel at such an angle that the filaments run from ridge to ridge in a series of straight-line paths; impregnating the layer of filaments; and removing the mandrel from the resulting tube. The ridged mandrel may be formed by helically winding a flexible rod or band on a cylindrical member or by provinding a series of axially spaced-apart discs on the cylindrical member.

Disclosure

This invention relates to a method of making corrugated, reinforced plastics tubes and, in particular, to such tubes where the wall thickness is small compared with the diameter of the tube.

According to the invention, a method of making a corrugated tube of fibre-reinforced plastics material comprises providing at least one layer of helically-wound filament around a mandrel of generally circular cross-section, the effective external surface of which comprises, in any axial section, a series of axially spaced, radially projecting ridges, the angle of winding and height of the ridges being chosen so that the filament runs under tension from ridge to ridge in a series of straight-line paths, impregnating the wound layer or layers with a resin, hardening the resin and removing the mandrel.

The depth of the corrugations of the tube so produced will be primarily determined by the angle of wind and the spacing between the ridges of the mandrel, provided that the height of the ridges is sufficient to allow the intermediate parts of the filaments to assume the positions dictated by the winding pattern, i.e. straight lines from ridge to ridge. It will be appreciated that because of the curvature of the ridges and the angle of winding, the mid points of these straight lines will define the troughs of the corrugations.

The "effective external surface" of the mandrel means that part of the surface which is in contact with the filament after winding, and can vary from a minimum consisting of the ridges alone to a maximum consisting of a fully-developed corrugated surface equivalent to that which would be generated during the subsequent winding operation.

The ridges may be formed by at least one band of flexible material mounted on and projecting from the curved surface of a cylindrical former. This may take the form of a series of projecting annular bands or the successive turns of a single helical band. The band or bands may conveniently comprise a flexible hard rubber rod or a rubber or plastic covered helical spring which may be wound tightly about the former to keep them in position during the filament winding operation. Alternatively, the ridges may comprise the edges of a series of discs spaced apart along a central support rod.

In a preferred method, at least one layer of filament is wound over the mandrel using a helical winding having an angle of wind equal to that to be used to wind the tube and the layer so produced sprayed with a film-forming solution, e.g. a rubber solution or ethyl cellulose, the film allowed to harden and the coated layer used as the effective surface of the mandrel. This method has two advantages, firstly, that the mandrel is provided with a complete corrugated surface which has been generated in the same way as the subsequent tube winding and must thus fit it exactly, so that the filaments are supported by the said surface over their entire length and, secondly, that resin which is used to impregnate the tube winding cannot drip into the inside of the mandrel.

The resin may be any curable plastics material, such as an epoxy-type cold or hot curing resin; impregnation may be achieved by passing the filament through the resin immediately before winding, coating the mandrel before winding, impregnating the wound layer or layers or by using previously impregnated filament.

The term "hardening" is intended to include air-drying the impregnated layer with or without heat to the fully or partially cured state, provided that the hardened layer is sufficiently self-supporting to enable the mandrel to be removed. If necessary, final curing may be accomplished by a separate operation, after removal of the mandrel.

The filament must possess sufficient tensile strength to enable it to be wound tightly about the mandrel, a preferred material being multi-strand glass-fibre rovings, specially selected for maximum tensile strength.

Several layers may be wound on to the mandrel to build up the wall thickness required in the finished tube, preferably using a reverse winding in successive layers, i.e. a helix of the same pitch but in the opposite sense.

In order that the invention may be more fully understood it will be described, by way of example only, by the following experiment, with reference to the accompanying drawings, in which.

Figure 1:
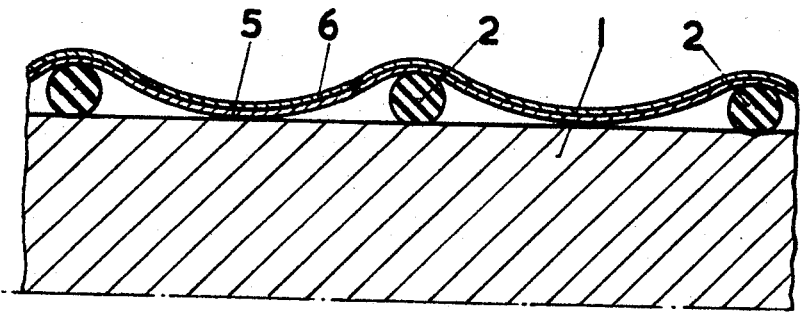
FIGURE 1 is a half-section through a finished corrugater tube before removal from its mandrel.

Referring to FIGURE 1, a cylindrical steel former 1 was treated with a parting agent and then hard rubber rod 2 was wound tightly on to former 1 in a helical pattern. A filament consisting of multi-strand glass rovings was then wound over the former 1 and rod 2 in a helical pattern of the type illustrated in FIGURE 2, in which the filament 3 is pulled tightly between ridges 4 so that it bridges the gap between them in a series of straight-line paths. When a complete layer 5 of filament had been built up, it was sprayed with a solution of ethyl cellulose which was allowed to harden, thus forming a corrugated mandrel.

Figure 2:
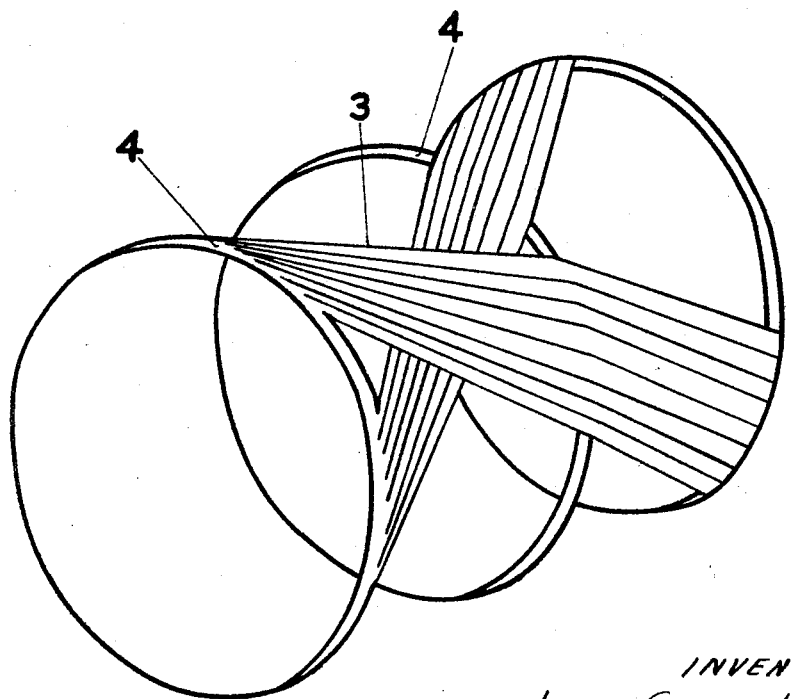
FIGURE 2 is a diagrammatic representation of the winding pattern of glass filament.

The outer layer 5 of the mandrel was then coated with a parting agent followed by a cold cure polyester resin and several layers 6 of glass filament were wound on to it using a pattern as shown in FIGURE 2, successive layers being wound in reverse directions. The completed layer 6 was then fully impregnated with the resin and the mandrel and tube rotated for approximately 4 hours at room temperature until the impregnated layer was cured to a solid state, and then post-cured in a hot-room at 45° C. for 24 hours.

When layer 6 was fully cured, steel former 1 was slid from the centre of the mandrel and the outer surface of the mandrel, comprising rod 2 and layer 5 was collapsed inwardly to allow it to be removed from layer or tube 6.

The tube thus formed was found to possess considerably greater resistance to crushing loads than a similar tube having an uncorrugated wall.

Figure 3:
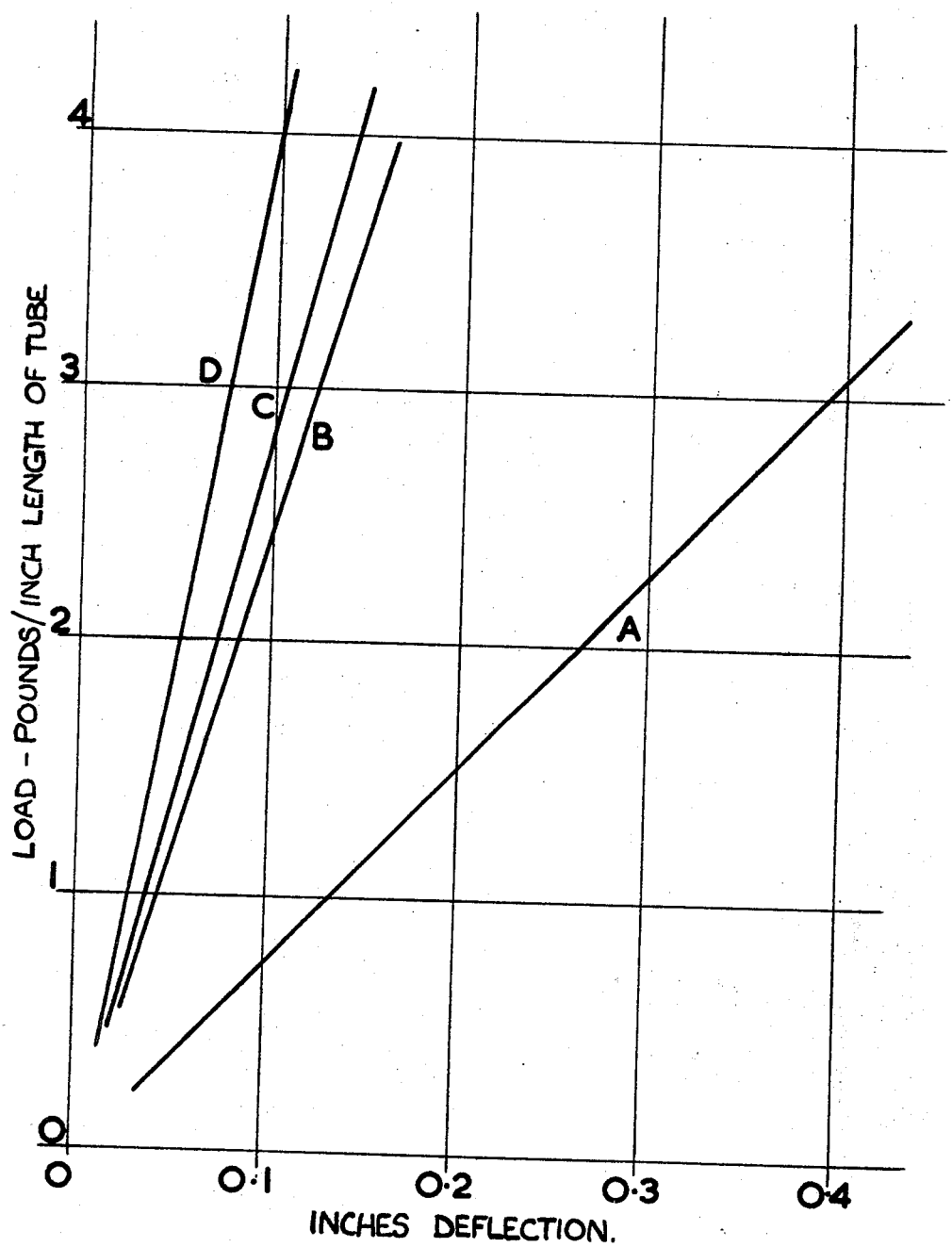
FIGURE 3 is a graph showing the relative strengths of corrugated and uncorrugated tubes.

The relative strengths of an uncorrugated tube and corrugated tubes having different depths of corrugations are shown in FIGURE 3. To test the tubes, they were placed on a horizontal bed and subjected to a varying vertical crushing load. The downward deflection of the upper wall of the tube was measured for each load, the smaller the deflection, the greater the resistance of the tube to the impressed load. In the graph, line A corresponds to a tube having an uncorrugated wall while lines B, C and D correspond to tubes having corrugations of $3/16''$, $5/16''$ and $1/2''$ depths, respectively. In each case the tube had an internal diameter of 11.7'' and a wall thickness of 0.09''.

Corrugated tubes made according to the invention may also be used as spacers in the formation of laminated tubes where it is desired to produce plain wall tubes having strengthening spacers between coaxial inner and outer walls.

I claim:

1. A method of making a corrugated tube of fibre-reinforced plastics material comprising the steps of providing a mandrel with a series of axially spaced, radially projecting ridges, helically winding at least one layer of filament around the mandrel, the angle of winding and height of the ridges being so chosen that the filament runs under tension from ridge to ridge in a series of straight-line paths, impregnating said layer with a resin, hardening the resin and removing the ridged mandrel.

2. A method as claimed in claim 1 in which prior to winding the tube the ridged mandrel is provided with at least one layer of helically wound filament, in which said layer is then coated with a film-forming solution and allowed to harden, and in which the corrugated surface thus produced is used to support subsequent tube winding.

3. A method as claimed in claim 1 in which the ridges are formed by mounting at least one band of flexible material on the curved surface of a cylindrical former so as to project therefrom.

4. A method as claimed in claim 3 in which the ridges are formed by helically winding successive turns of the band about the former.

References Cited

UNITED STATES PATENTS

| | | | |
|---|---|---|---|
| 1,280,170 | 10/1918 | Crawford | 156—189 XR |
| 2,629,894 | 3/1953 | Boggs | 156—173 XR |

FOREIGN PATENTS 556,467   4/1958   Canada.

PHILIP DIER, *Primary Examiner.*

U.S. Cl. X.R.

138—122; 156—443